United States Patent

Janca et al.

Patent Number: 5,928,682
Date of Patent: Jul. 27, 1999

[54] ANNULAR GATED MOLD FOR THE INJECTION MOLDING OF CONTACT LENSES

[75] Inventors: Joseph E. Janca; Carl G. Crowe, both of Jacksonville, Fla.

[73] Assignee: Johnson & Johnson Vision Products, Inc., Jacksonville, Fla.

[21] Appl. No.: 08/576,743

[22] Filed: Dec. 21, 1995

[51] Int. Cl.$^6$ ....................................... B29D 11/00
[52] U.S. Cl. .................... 425/566; 425/562; 264/328.9
[58] Field of Search ......................... 425/292, 808, 425/806, 553, 566, 562; 264/163, 161, 328.9

[56] References Cited

U.S. PATENT DOCUMENTS

| | | | |
|---|---|---|---|
| 4,407,766 | 10/1983 | Haardt et al. | 264/2.2 |
| 4,569,807 | 2/1986 | Boudet | 264/2.2 |
| 4,622,089 | 11/1986 | Spector et al. | 264/2.2 |
| 4,836,960 | 6/1989 | Spector et al. | 425/555 |
| 5,182,065 | 1/1993 | Piotrowski et al. | 264/153 |
| 5,460,497 | 10/1995 | Vismara | 425/122 |

OTHER PUBLICATIONS

Plastics Processing, vol. 18, pp. 203–204, 1982.

Primary Examiner—Thomas R. Weber

[57] ABSTRACT

A method and apparatus for the manufacture of optical polymer contact lenses in a closed mold, where a mold cavity is created between a front curve insert and a back curve insert, the side walls of the mold cavity being formed by the inner wall of a movable annular gate collar, the collar being positioned in a retracted position during polymer dosing and then moved prior to polymer cure into an extended position to complete the mold cavity and to separate the polymer curing inside the mold cavity from any waste polymer outside of the mold cavity.

9 Claims, 2 Drawing Sheets

ANNULAR GATED MOLD FOR THE INJECTION MOLDING OF CONTACT LENSES

BACKGROUND OF THE INVENTION

This invention relates generally to a method and apparatus for the direct injection molding of optical contact lenses, and in particular for reaction injection molding (RIM) contact lenses. More particularly, it relates to such a method and apparatus involving a closed molding system, where after dosing the polymer into the closed mold an annular collar is actuated to define the side wall of the mold and completely separate the waste polymer from the contact lens forming polymer material during polymer cure.

Reaction injection molding is a polymer process operation where reactive liquid components are mixed by impingement, injected into a mold and polymerized therein to form a plastic article. No external curing by ultraviolet light, heat or the like is required, the cure resulting from the chemical reaction of the liquid components. Reaction injection molding may be accomplished in an open or closed mold. Open molding means that the mold cavity is open while the liquid polymer is dosed into one half of the mold, with the other half of the mold then positioned and closed under pressure to establish the complete mold cavity and define the optical lens. Closed molding means that the mold cavity components are mated prior to dosing of the liquid polymer, the mold cavity including a gate or port for injection of the reactive liquid components under pressure into the cavity and an outlet for run-off of excess polymer.

RIM and standard injection molding have the required precision for the production of optical contact lenses, but the known techniques are deficient due to the mechanism for dosing the mold. Because the liquid polymer components are made to flow into the mold cavity through a gate or sprue on the side wall of the lens, a small amount of material cures in the gate itself and must later be removed from the cured lens in a separate process step.

It is an object of this invention to provide an apparatus and associated process for the molding of contact lenses in a closed mold system which eliminates the problem caused by introduction of the polymer into the mold through a side gate. It is an object to provide such a solution which is applicable to both standard injection molding and to reaction injection molding. It is a further object to provide an actuated annular gate or collar member which becomes the side wall of the mold cavity. It is a further object to provide such an annular collar which when actuated defines a mold cavity for the curing of the polymer in which the curing polymer material of the contact lens is no longer in contact with the waste polymer material in the gate or sprue.

SUMMARY OF THE INVENTION

The invention comprises in general a method and apparatus for the fabrication of polymer contact lenses in a closed mold system. The invention has particular application to such manufacture using the reaction injection molding process where the liquid polymer components react upon mixing and require no outside agency to initiate or control curing. The apparatus comprises in general a closed mold formed of multiple joined components which define a mold cavity of the shape, size and configuration desired for production of the contact lens—a curved body with a circular perimeter or side wall. The mold block comprises an inlet runner to supply liquid polymer components into the mold cavity through an inlet port or sprue positioned on the side of the mold cavity. An outlet port and runner positioned on the opposite side of the mold cavity allow flow out of the mold of excess liquid polymer components. A moveable annular gate collar surrounds the mold cavity, the collar being positionable from a recessed position during cavity fill to a closed position where the interior wall of the collar forms the circular side wall of the mold cavity during the curing process.

To manufacture the contact lens, sufficient liquid polymer is injected into the closed mold cavity through the inlet runner and inlet port to entirely fill the mold cavity, with any excess polymer flowing out through the outlet port and outlet runner. The annular gate collar is in the recessed or retracted position during the fill step so that polymer flow is not impeded. When the mold is filled and prior to cure, the annular gate collar is actuated and moved into position surrounding the mold cavity to form the uninterrupted side wall component of the mold cavity. The annular collar severs or separates the liquid polymer such that the curing contact lens is not connected to any excess or waste polymer in the inlet port or outlet port which would require subsequent processing to remove such waste from the lens.

DETAILED DESCRIPTION OF THE INVENTION

With reference to the drawings, the invention will now be defined in greater detail with regard for the preferred embodiment and best mode. The invention is a method and apparatus for injection molding fabrication of optical contact lenses in a closed mold system, and is particularly suitable for use in a reaction injection molding system where multiple liquid polymer components are mixed and injected into the mold cavity, the polymer curing from the chemical reaction of the combined components without need for outside curing from ultraviolet light, heat, etc. As such, the methodology and apparatus will be discussed herein with regard to a reaction injection molding system, but with the understanding that the invention is applicable in standard injection molding as well, the distinction being that provision for curing by outside effects must be incorporated.

Figure 1:
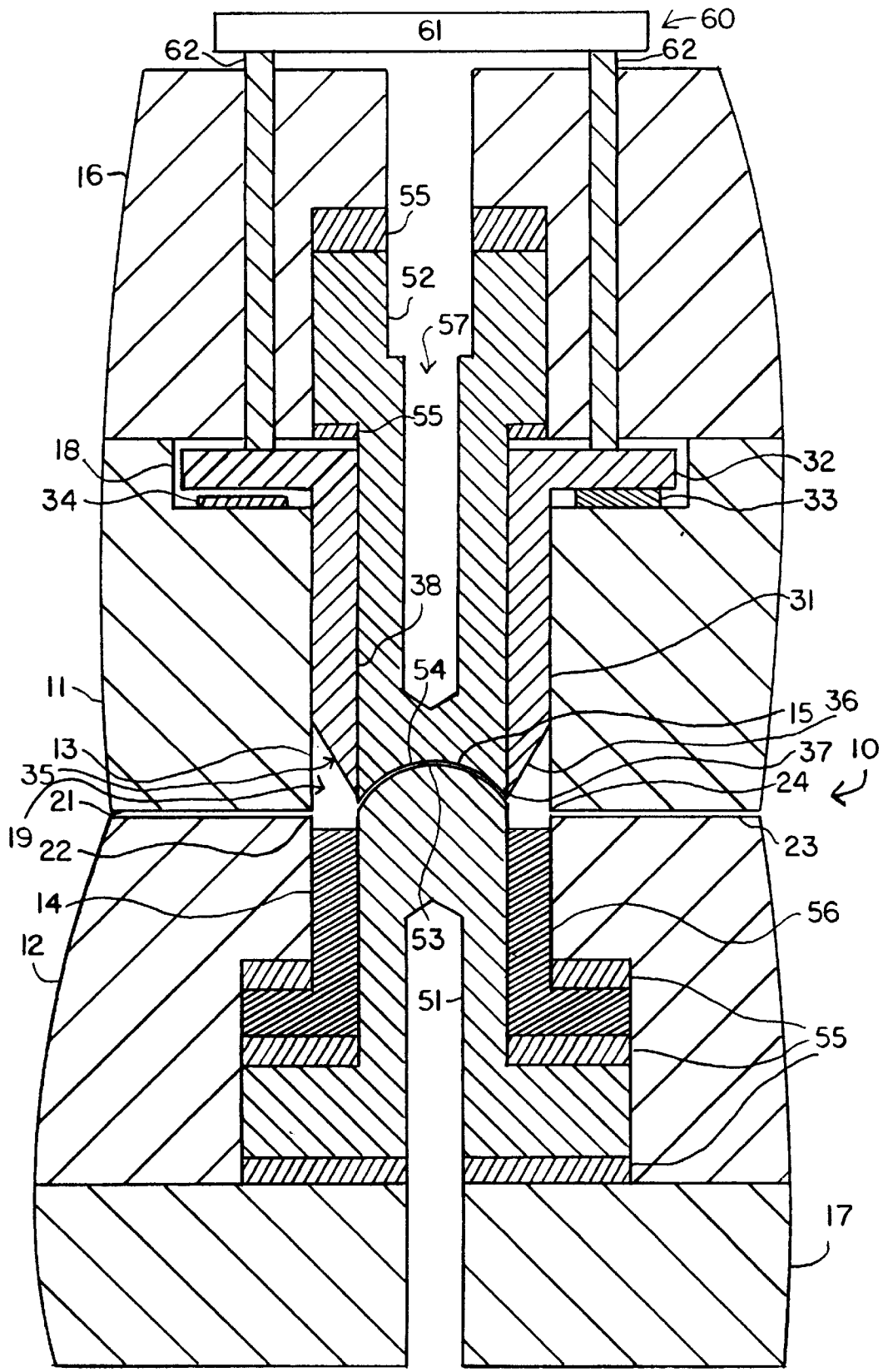
FIG. 1 is cross-sectional view of the invention shown with the annular gate in the recessed position prior to the filling of the mold cavity.

Referring now to FIG. 1, it is shown that the apparatus of the invention comprises in general a mold block 10 comprised of an upper mold plate 11 and a lower mold plate 12 which are adapted to mate together to form the mold block 10 and which are typically held together hydraulically during the molding process. Upper mold plate 11 is provided with an upper mold bore 13 and lower mold plate 12 is provided with a lower mold bore 14, each positioned so as to align on the same central axis when the upper mold plate 11 and lower mold plate 12 are joined. An inlet runner 21 is provided in one or both of upper mold plate 11 and lower mold plate 12, the inlet runner 21 connecting to an inlet port or sprue 22 abutting one or both of the upper mold bore 13 and lower mold bore 14. An outlet runner 23 and outlet port 24 are likewise positioned in either one or both upper mold plate 11 and lower mold plate 12. In FIG. 1, the inlet runner 21, inlet port 22, outlet port 24 and outlet runner 23 are shown as positioned in the lower mold plate 12 and abutting the lower mold bore 14. The inlet runner 21 is connected to polymer injection apparatus of type well known in the art, which is not shown in the drawings, for injection of the liquid polymer components 99 into the mold in known manner.

The lower and upper mold bores 14 and 13 are adapted to receive and properly position the component parts which define the mold cavity 15 in which the contact lens is formed. The mold cavity 15 is created by providing a back curve insert 51 and a front curve insert 52, the back curve insert 51 having a convex face 53 to define the back wall of the contact lens and the front curve insert 52 having a concave face 54 to define the front wall of the contact lens. The curve inserts 51 and 52 are properly positioned within each mold plate 11 and 12 and relative to each other to provide the correct thickness for the mold cavity 15 by the use of various shims 55 and bushings 56 in the currently known manner. As shown in FIG. 1, the curve inserts 51 and 52 are fixed in the mold plates 11 and 12 by attaching upper retainer plate 16 to upper mold plate 11 and lower retainer plate 17 to lower mold plate 12. The curve inserts 51 and 52 may be provided with thermocouple ports 57 to insure correct processing parameters, as is also well known in the art.

Surrounding one of the curve inserts 51 or 52, and preferably surrounding the front insert curve 52 as shown in the drawings, is annular gate collar 31. The annular gate 31 is coaxially aligned with the front curve insert 52 and is adapted for movement in the axial direction within upper mold bore 13 relative to the fixed upper mold plate 11 and front curve insert 52. The tolerance between the outer wall of the front curve insert 52 and the inner wall 38 of the gated collar 31 should be kept to a minimum, and preferably less than 0.001 inches. Annular gate 31 has a flange 32 at its upper end which seats in a flange recess 18 in the upper mold plate 12. Positioned between the bottom of the flange 18 and the top of the flange recess 18 are one or more spring members 33. Springs 33 are preferably positioned within apertures in an apertured shim 34, the apertured shim 34 acting as a stop to properly limit downward travel of annular gate collar 31, although flange recess 18 alone can be utilized for this stopping function. The gate collar 31 is connected to reciprocating actuating means 60, which can comprise any means to rapidly reciprocate gate collar 31 in the axial direction. As shown in FIG. 1, actuating means 60 may comprise one or more pneumatic pistons 61, shown representationally, connected to the gate collar 31 by piston pins 62.

The lower end of the gate collar 31 is formed as an annular blade 35 having a bevelled outer wall 36, preferably at an angle of approximately 30 degrees, terminating in a non-radiused tip 37 preferably with a thickness of less than 0.005 inches. The tip 37 of gate collar 31 must be able to travel a distance in excess of the thickness of the mold cavity 15, i.e., the separation distance between the convex face 53 and concave face 54. For example, with the front curve insert 52 and back curve insert 51 positioned to create a mold cavity 15 for a contact lens with a thickness of 0.11 millimeters, the gate collar 31 is adjusted by proper sizing of the apertured shim 34 to allow for travel in the axial direction of approximately 0.15 to 0.20 millimeters.

Figure 2:
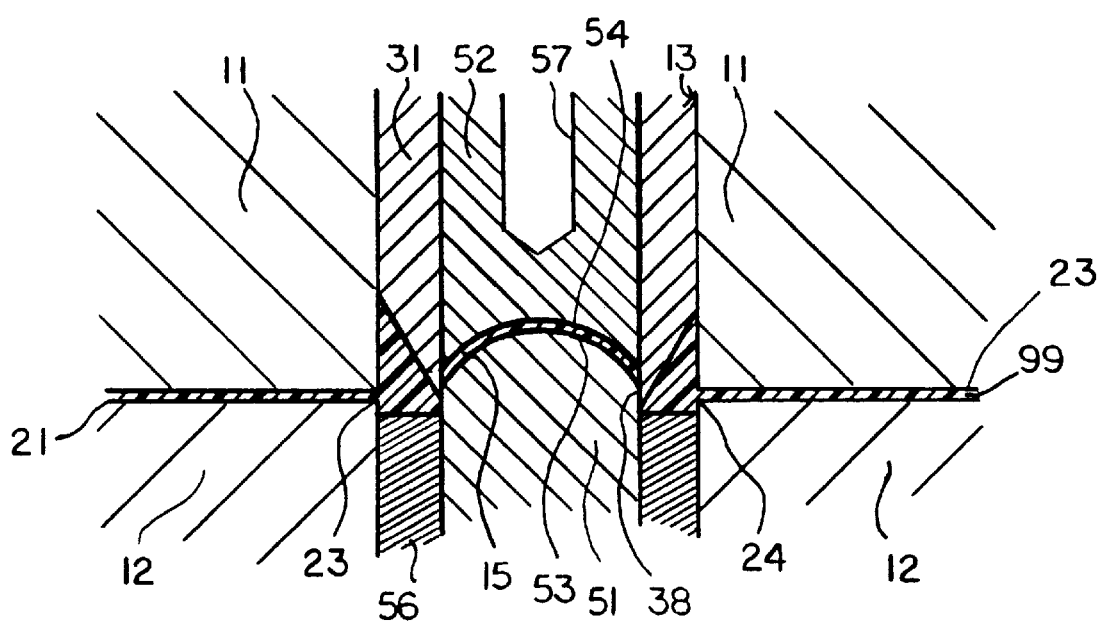
FIG. 2 is a cross-sectional view of a segment of the full invention which shows the annular gate in the actuated extended position forming the side wall of the mold cavity after severing the liquid polymer and during the cure of the polymer.

In the recessed position, as shown in FIG. 1, the tip 37 of the blade portion 35 does not impede flow of the liquid polymer components 99 into the mold cavity 15. Once the mold cavity 15 is filled and prior to curing of the polymer components 99 in the mold cavity 15, the actuating means 60 to reposition the gate collar 31 is activated, pushing the collar 31 downward into the extended position such that the blade tip 37 passes through the liquid polymer 99 and passes the edge of the convex face 53 of the back curve insert 51, as shown in FIG. 2. The inner wall 38 of the gate collar 31 now forms the circular side wall of the mold cavity 15 as the polymer components 99 react and cure, the mold cavity 15 for the contact lens now consisting of the convex face 53 of the back curve insert 51, the concave face 54 of the front curve insert 52, and the annular inner wall 38 of the gate collar 31. Excess polymer 99 is compressed by the bevelled wall 36 into the annular supply recess 19 or forced back into the inlet runner 21 or the outlet runner 23. The bevelled wall 36 of the blade 35 also helps to maintain proper axial alignment of the gate collar 31 as it moves through the liquid polymer 99. Because the inner wall 38 of the gate collar 31 is continuous, the liquid polymer 99 curing in the mold cavity 15 is not in contact with and is completely separated from the waste liquid polymer 99 at the inlet port 22 or the outlet port 24, and therefore the side wall of the cured contact lens will not require subsequent processing to remove any excess material. After cure is complete, the mold block 10 is separated and the finished product removed, along with the separate polymer waste now cured in the runners 21 and 23.

It is contemplated that equivalents and substitutions may be apparent to those skilled in the art, and the above examples are by way of illustration only. The true scope and definition of the invention therefore is to be as set forth in the following claims.

We claim:

1. An apparatus for the closed mold fabrication of polymer contact lenses by injection molding comprising:

(A) a mold block for containing in fixed relationship a front curve insert and a back curve insert, said mold block comprising an inlet runner to deliver liquid polymer components to a mold cavity partially defined by the combination of said front curve insert and said back curve insert, said mold cavity having a convex face and a concave face;

(B) a movable annular gate collar positioned between said mold block and said mold cavity comprising an inner wall adapted to surround said mold cavity to form the side wall of said mold cavity, said annular gate collar having a recessed position during which liquid polymer components may be delivered to said mold cavity and an extended position during which said inner wall surrounds said mold cavity to completely enclose said mold cavity.

2. The apparatus of claim 1, further comprising actuating means to move said annular gate collar relative to said mold cavity.

3. The apparatus of claim 2, where said annular gated collar further comprises a blade comprised of a bevelled edge and a tip.

4. The apparatus of claim 1, where said mold block further comprises an upper mold plate containing an upper mold bore and a lower mold plate containing a lower mold bore, said upper and lower mold bores adapted to receive said front curve insert and said back curve insert.

5. The apparatus of claim 4, where said actuating means comprises a pneumatic piston.

6. In a mold block having an inlet runner used in an injection molding apparatus for manufacturing contact lenses comprising means to inject polymer material into a mold cavity defined by the fixed combination of a front curve insert having a concave surface and a back curve insert having a convex surface, the improvement comprising a movable annular gate collar positioned between said mold block and one of said curve inserts, said annular gate collar having a circular inner wall surrounding one of said curve inserts, whereby said annular gate collar is positionable in a retracted position during injection of said polymer material into said mold cavity and then after said mold cavity is filled said annular gate collar is movable into a position whereby said inner wall of said annular gate collar forms the circular side wall of and completely encloses said mold cavity.

7. The apparatus of claim 6, where said gate collar further comprises a blade comprised of a bevelled edge and a tip.

8. The apparatus of claim 6, further comprising actuating means to move said gate collar.

9. The apparatus of claim 8, where said actuating means comprise a pneumatic piston.

* * * * *